United States Patent [19]  
Miller

[11] 4,193,898  
[45] Mar. 18, 1980

[54] PROTECTIVE COVERING MATERIAL FOR USE SUCH AS SHINGLES AND SIDING

[76] Inventor: Sidney A. Miller, 821 Midway Dr. NE., Lacey, Wash. 98503

[21] Appl. No.: 867,798

[22] Filed: Jan. 19, 1978

[51] Int. Cl.² .......................................... C08L 27/06
[52] U.S. Cl. ........................... 260/23 XA; 260/42.13; 260/42.22; 260/42.37; 260/DIG. 24; 427/186
[58] Field of Search ............ 260/23 XA, 42.13, 42.22, 260/42.37, DIG. 24; 427/186

[56] References Cited

U.S. PATENT DOCUMENTS

| | | | |
|---|---|---|---|
| 1,325,110 | 12/1919 | Robinson | 118/259 |
| 2,418,843 | 4/1947 | Leatherman | 260/32.8 |
| 2,782,129 | 2/1957 | Donegan | 427/186 |
| 2,798,822 | 7/1957 | Carter | 427/186 |
| 3,257,338 | 6/1966 | Sefton | 260/42.13 |
| 3,782,988 | 1/1974 | Alexander et al. | 106/282 |
| 3,868,341 | 2/1975 | Sauer et al. | 260/23 XA |
| 3,897,346 | 7/1975 | Vogel | 260/42.24 |
| 3,897,387 | 7/1975 | O'Shaughnessy | 260/28.5 A |
| 3,948,833 | 4/1976 | Kacir et al. | 260/23 EP |
| 3,993,607 | 11/1976 | Florence | 260/42.49 |

OTHER PUBLICATIONS

Chemical Abstracts, vol. 78, No. 20, May 21, 1973, p. 125516q.

Chemical Abstracts, vol. 80, No. 12, Mar. 25, 1974, p. 60614q.

Chemical Abstracts, vol. 81, No. 22, Dec. 2, 1974, p. 137110c.

Chemical Abstracts, vol. 81, Jul.–Dec. 1974, Chem. Substance Index, & pp. 4359cs & 4360cs, "Vermiculite".

*Primary Examiner*—Ronald W. Griffin  
*Attorney, Agent, or Firm*—Mattern, Diets, Kessler & Moravan

[57] ABSTRACT

A protective covering material for use such as shingles and siding is primarily composed of a formulation of polyvinyl chloride resin and plasticizer which is mixed with vermiculite is disclosed. The plasticized polyvinyl chloride formulation is approximately composed of 81.5 parts of polyvinyl chloride resin suspension polymer, 23.5 parts plasticizer Di-2-ethylhexyl phthalate, 2.75 parts epoxidized soybean oil, 1.25 parts barium calcium and 1 part copper sulphate. The formula and ingredients and vermiculite are mixed and subsequently heated until they reach a liquid state, whereupon as a mixture they are extruded into sheet-like form and chill-rolled. After the sheet of the combined formulation and vermiculite reach the proper temperature, the sheet is cut into the desired configuration for roofing shingles or other protective covering materials.

19 Claims, 1 Drawing Figure

PROTECTIVE COVERING MATERIAL FOR USE SUCH AS SHINGLES AND SIDING

BACKGROUND OF THE INVENTION

Wood, clay and asphalt shingles are heavy and cumbersome for roofers to affix. The heavy weight of the shingles reflects itself in added labor expense especially when a job requires a roofer to manually pack the squares from the ground to the roof. The shingles disclosed herein, produced from a plasticized polyvinyl chloride formula and vermiculite are approximately ⅔ lighter than conventional roofing materials. In addition to labor savings, the lesser weight is advantageous structurally.

The second advantage of the disclosed shingles are their fire resistance qualities. Cedar shakes will burn and asphalt shakes will melt when subjected to fire. The combination of polyvinyl chloride and vermiculite shingles are fire resistant.

A further advantage of the disclosed shingles are their superior qualities as an insulator.

Shingles now used for roofing, especially those used in damp climates, are susceptible to vegetation growth. Due to the composition of the disclosed shingles and their method of production, vegetation preventatives such as zinc oxide may be added to the composition of the shingles without detracting from the shingles qualities.

Clay and wood shingles are not pliable. Asphalt shingles are pliable in warm weather but become brittle in cold weather. Due to the plasticizer added to the shingles, the shingles are pliable and bendable in all climatic conditions.

In U.S. Pat. No. 1,325,110 a machine for applying coloring or treating shingles is disclosed. In U.S. Pat. No. 1,325,110 the process is for the treating of shingles and roofing products, whereas in the present disclosure the method actually produces the shingles and roofing material itself.

Polyvinyl chloride has been used with a number of other compounds in establishing various products. The fire resistant and fire retardant qualities of polyvinyl chloride are known in combination with certain other elements. Thus, in U.S. Pat. No. 3,868,341 by Sauer polyvinyl chloride is combined with a number of other compounds and elements to produce a clear flame retardant composition. The composition is primarily used for jacketing a live cord of a telephone line set.

Further fire resistant and fire retardant compositions are disclosed in the following patents: U.S. Pat. No. 3,897,346 by Vogel discloses a flame retardant agent for synthetic plastics which also has the property of stabilization against degradation by ultraviolet or diffused light; U.S. Pat. No. 3,897,387 by O'Shaughnessy discloses a method of rendering organic materials generally of hydrocarbon nature fire retardant; and U.S. Pat. No. 2,418,843 which discloses polyvinyl chloride in combination with other compounds which forms a fire retardant coating for fibrous materials.

Although the fire retardant properties that can be achieved with combinations of polyvinyl chloride with other compounds is known, the use of polyvinyl chloride with vermiculite for roofing compounds is not known.

The combination of a polyvinyl chloride resin, plasticizer and vermiculite not only provides the shingles fire resistant but provides the additional properties necessary for roofing materials.

SUMMARY OF THE INVENTION

A formula primarily composed of polyvinyl chloride resin and plasticizer is mixed with vermiculite to produce roofing shingles. The shingles are both lighter than conventional roofing shingles and are pliable in all climatic conditions.

The plasticized polyvinyl chloride formula in the preferred embodiment is composed of the following ingredients by weight: 71.5 parts polyvinyl chloride resin suspension polymer; 23.5 parts plasticizer Di-2-ethylhexyl phthalate; 2.75 parts epoxidized soybean oil; 1.25 parts barium calcium and 1 part copper sulphate.

A mixing component receives both the formula and the vermiculite. After mixing, the mixture proceeds through heating elements until it reaches a fluid state. The fluid is then forced through the extruding dye forming a sheet-like projection. The sheet-like projection is then chill-rolled and embossed. The sheet is then cut into the desired configuration.

DETAILED DESCRIPTION OF THE DRAWINGS

Figure 1:
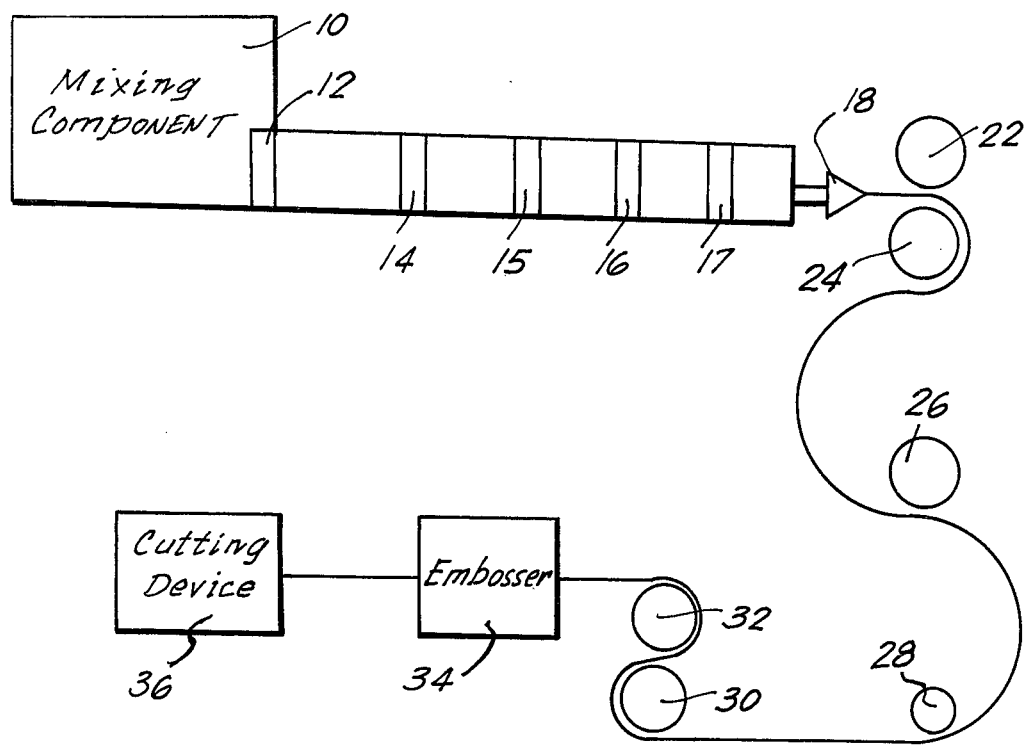
FIG. 1 is a schematic of the process of the production of the disclosed shingles from the mixing of the plasticized polyvinyl chloride formula and vermiculite through to the final cutting of the shingles into their desired configuration.

Roofing shingles composed of a formulation primarily consisting of powdered plasticized polyvinyl chloride is mixed with powdered vermiculite. The shingles produced are advantageous in the following aspects: lighter weight, fire resistant, superior insulation qualities, pliable in all climatic conditions, and capable of accepting vegetation preventative in the composition without detracting from the shingles qualities.

The plasticized polyvinyl chloride formulation in the preferred embodiment is composed of the following ingredients by weight: 71.5 parts polyvinyl chloride resin suspension polymer; 23.5 parts plasticizer Di-2-ethylhexyl phthalate; 2.75 parts epoxidized soybean oil; 1.25 parts barium calcium; and 1 part copper sulphate.

Although in the preferred embodiment given amounts of weight are combined in the above formulation, it is to be understood that variations of the above ingredients may achieve substantially the same results.

Presently, the inventors are using Geon 8815 produced by the B. F. Goodrich Chemical Company and adding copper sulphate to arrive at the above formulation.

Polyvinyl chloride is a member of a large family of polymers. In the preferred embodiment, the PVC is a polyvinyl chloride homopolymer. Delineating further, the polyvinyl chloride resin is a suspension polymer with an inherent viscosity determined as ASTM-1243-66[0.98-1.04]. The inherent viscosity is a reflection of the molecular weight of this particular suspension polymer and it is to be understood that suspension polymers of molecular weights varying in a range broader than the 0.98-1.04 may be used in the formulataion.

In determining the amount of polyvinyl chloride resin suspension polymer that may be used in conjunction with the other ingredients of the above formula, a range of 64 to 80 parts by weight of a total 100 is suitable.

Plasticizers are added to thermoplastic material to facilitate processing during extrusion. The function of the plasticizers is to separate the long chain molecules and lubricate them so that they slip and slide with comparative ease. In the preferred embodiment, the platsicizer Di-2-ethylhexyl phthalate is used. A number of other plasticizers which achieve the above function also may be used to achieve the formula. The plasticizer may vary from 18 to 30 parts by weight of a total 100 of the formula. The plasticizer gives the roofing material the quality of flexibility and provides flexibility regardless of a climatic condition.

Epoxidized soybean oil in combination with barium calcium gives the shingles heat and light stabilization. The epoxidized soybean oil may be varied from 1 to 6 parts by weight of a total 100 of the formula. The barium calcium may be varied from 0.5 to 3 parts by weight of a total 100 of the formula.

Copper sulphate is added to the formula as a vegetation preventative. With the copper sulphate in the roofing material moss and similar vegetation will not grow in the roofing material. The copper sulphate may be varied from 0.25 to 2 parts by weight of a total 100 of the formula.

In the preferred embodiment, the formula and the vermiculite are mixed in a powdered form. However, the proper mixture may be obtained with plasticized polyvinyl chloride in various other forms such as pellets.

The formula of polyvinyl chloride resin suspension polymer; plasticizer; epoxidized soybean oil; barium calcium; and copper sulphate is combined with vermiculite. When measuring the formula and vermiculite by volume, approximately equal volumes of both the plasticized polyvinyl chloride formula and vermiculite are combined. The combination of the plasticized polyvinyl chloride formula and 40% plasticized polyvinyl chloride formula on one end of the spectrum and 40% vermiculite and 60% plasticized polyvinyl chloride formula on the other end of the spectrum without substantial variations in the resultant roofing material. However, as the percentage of vermiculite rises the tensile strength of the roofing material drops.

When measuring vermiculite by weight, approximately 1 part of vermiculite is added to 3 parts of formula.

Vermiculite is a mica type mineral that has been expanded by heat to form light-weight, sterile, highly absorbent particles containing many air spaces.

In the preferred embodiment, the powdered formula is mixed with the vermiculite in mixing component 10. The mixing component 10 obtains a uniform consistency of the two elements—plasticized polyvinyl chloride formula and vermiculite. A coloring compound 12 may be added in the mixing component 10 or may be added later in the process.

After the proper mixture is achieved in the mixing component 10 the mixture is forced through heating elements 14, 15, 16, and 17. In the preferred embodiment, the mixture proceeds through four heating elements 14, 15, 16, and 17 but the mixture may be heated by a lesser or greater number of heating elements.

The heating elements 14, 15, 16, and 17 heat the mixture to between 360° and 370° Fahrenheit. At this temperature, the mixture of the plasticized polyvinyl chloride formula and vermiculite becomes a fluid. If the temperature rises above 370° Fahrenheit the tensile strength of the roofing material drops.

The fluid is then forced through the extruding dye 18 forming a sheet-like projection 20. The sheet-like projection 20 proceeds through chill rolls 22, 24, and 26 allowing the sheet 20 to cool and reach a proper consistency. The sheet 20 is then cooled by roller 28 and proceeds onto rollers 30 and 32. Rollers 30 and 32 insure the thickness of the sheet 20. After the sheet 20 leaves the rollers 30 and 32 the sheet enters the embosser 34.

The particular amounts of substances chosen in describing the formulation and subsequent mixing with vermiculite are only pertinent in regards to their percentages. Since varying amounts of vermiculite may be processed with varying amounts within the formulation, percentage amounts of 100 parts of the formulation are first considered. The varying amounts of formulation are then combined as a group as a percentage of 100 parts in combination with vermiculite in the claims.

After completing the process in the embosser 34, the sheet 20 is passed through the cutting device 36 which cuts the product into the desired configurations for instance roofing tabs.

I claim:

1. A protective covering material useful as roofing or siding material comprising:
    (a) a formulation of 100 parts by weight of the following ingredients:
        64 to 80 parts by weight percent of a total 100 of polyvinyl chloride resin; and
        20 to 36 parts by weight percent of a total 100 of plasticizer;
    (b) the said formulation of polyvinyl chloride resin and plasticizer is admixed as 60 to 90 parts by weight percent of a total 100 with 40 to 10 parts by weight percent of vermiculite.

2. The protective covering material of claim 1 wherein the formulation of sub-paragraph (a) comprises:
    63.5 to 79.5 parts by weight percent of a total 100 of a polyvinyl chloride resin;
    19.5 to 35.5 parts by weight percent of a total 100 of a plasticizer; and
    1 to 6 parts by weight percent of a total 100 of epoxidized soybean oil.

3. The protective covering material of claim 1 wherein the formulation of sub-paragraph (a) comprises:
    63.25 to 79.25 parts by weight percent of a total 100 of a polyvinyl chloride resin;
    19.25 to 35.25 parts by weight percent of a total 100 of a plasticizer;
    1 to 6 parts by weight percent of a total 100 of epoxidized soybean oil;
    0.25 to 1.5 parts by weight percent of a total 100 of barium; and
    0.25 to 1.5 parts by weight percent of a total 100 of calcium.

4. The protective covering material of claim 3 wherein the plasticizer is Di-2-ethylhexyl phthalate.

5. The protective covering material in claim 4 wherein the epoxidized soybean oil comprises 1.25 parts by weight percent of a total 100 of the formulation of sub-paragraph (a).

6. The protective covering material of claim 1 wherein the formulation of sub-paragraph (a) comprises:

63.125 to 79.125 parts by weight percent of a total 100 of a polyvinyl chloride resin;

19.125 to 35.125 parts by weight percent of a total 100 of a plasticizer;

1 to 6 parts by weight percent of a total 100 of epoxidized soybean oil;

0.25 to 1.5 parts by weight percent of a total 100 of barium;

0.25 to 1.5 parts by weight percent of a total 100 of calcium; and 0.25 to 2 parts by weight percent of a total 100 of copper sulphate.

7. The protective covering material of claim 6 wherein the polyvinyl chloride resin is a suspension polymer with an inherent viscosity of ASTM-1243-66[0.98-1.04].

8. The protective covering material in claim 6 wherein the polyvinyl chloride resin comprises 71.5 parts by weight percent of a total 100 of the said formula.

9. The protective covering material in claim 8 wherein the plasticizer Di-2-ethylhexyl phthalate comprises 23.5 parts by weight percent of a total 100 of the formulation of sub-paragraph (a).

10. The protective covering material in claim 9 wherein the barium and the calcium comprises 1.25 parts by weight percent of a total 100 of the formulation of sub-paragraph (a).

11. The protective covering material in claim 6 wherein copper sulphate comprises 1 part by weight percent of a total 100 of the formulation of sub-paragraph (a).

12. The protective covering material in claim 6 wherein the vermiculite comprises 25 parts by weight percent of a total 100 and the formulation of sub-paragraph (a) of claim 6 comprises 75 parts by weight percent of a total 100.

13. A method of producing a protective covering material which comprises the steps of mixing, heating to a liquid, forming the liquid into a sheet, cooling the sheet, cutting the sheet into the desired configurations, of the following material comprising:

(a) a formula of 100 parts by weight of the following ingredients:

64 to 80 parts by weight percent of a total 100 of polyvinyl chloride resin;

20 to 36 parts by weight of a total 100 plasticizer Di-2-ethylhexyl phthalate;

(b) the said formulation of polyvinyl chloride resin and plasticizer is admixed as 60 to 90 parts by weight percent of a total 100 with 40 to 10 parts by weight percent of vermiculite.

14. The method of producing a protective covering material in claim 13 wherein the material is heated to a liquid state between 360° to 370° Fahrenheit.

15. The method of producing a protective covering material in claim 14 wherein the material is heated by four separate heaters.

16. The method of producing a protective covering material in claim 15 wherein an extruding dye forms the liquid into a sheet.

17. The method of producing a protective covering material in claim 16 wherein chill rollers chill the sheet to the desired temperature while monitoring the thickness of the sheet.

18. The method of producing a protective covering material in claim 17 wherein the material comprises:

(a) a formula of 100 parts by weight of the following ingredients:

63.125 to 79.125 parts by weight percent of a total 100 of a polyvinyl chloride resin;

19.125 to 35.125 parts by weight percent of a total 100 of a plasticizer;

1 to 6 parts by weight percent of a total 100 of epoxidized soybean oil;

0.25 to 1.5 parts by weight percent of a total 100 of barium;

0.25 to 1.5 parts by weight percent of a total 100 of calcium;

0.25 to 2 parts by weight percent of a total 100 of copper sulphate.

(b) the said formulation of polyvinyl chloride resin and plasticizer is admixed as 60 to 90 parts by weight percent of a total 100 with 40 to 10 parts by weight percent of vermiculite.

19. The method of producing a protective covering material in claim 16 wherein a coloring agent is added in the mixing component thereby achieving the desired color for the protective covering material.

* * * * *